United States Patent
Grundei

(10) Patent No.: US 6,540,051 B2
(45) Date of Patent: Apr. 1, 2003

(54) DAMPING FORCE DEVICE WITH ADJUSTABLE DAMPING FORCE

(75) Inventor: Manfred Grundei, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/747,217

(22) Filed: Dec. 21, 2000

(65) Prior Publication Data

US 2001/0013451 A1 Aug. 16, 2001

(30) Foreign Application Priority Data

Dec. 22, 1999 (DE) .......................... 199 61 963

(51) Int. Cl.⁷ .............................. B60G 17/08; F16F 9/46
(52) U.S. Cl. ..................... 188/302; 188/306; 188/266.2
(58) Field of Search ....................... 280/5.507, 124.106, 280/124.157; 188/266.1, 266.2, 266.6, 299.1, 302–306, 308; 267/67.16, 64.17, 67, 188, 191, 218, 223

(56) References Cited

U.S. PATENT DOCUMENTS

| 1,954,196 A | * | 4/1934 | Breer et al. ............... 188/299.1 |
|---|---|---|---|
| 2,021,043 A | * | 11/1935 | Bedford et al. ........... 188/299.1 |
| 2,085,454 A | * | 6/1937 | Mercier .................... 188/299.1 |
| 3,727,947 A | * | 4/1973 | Small ....................... 137/596.1 |
| 5,392,885 A | * | 2/1995 | Patzenhauer et al. ... 188/322.13 |
| 5,937,975 A | * | 8/1999 | Forster ..................... 188/266.6 |
| 6,015,030 A | * | 1/2000 | Grundei .................... 188/266.2 |
| 6,305,512 B1 | * | 10/2001 | Heinz et al. .............. 188/299.1 |

FOREIGN PATENT DOCUMENTS

DE  196 37 095  3/1998

* cited by examiner

Primary Examiner—Christopher P. Schwartz
(74) Attorney, Agent, or Firm—Cohen, Pontani, Lieberman & Pavane

(57) ABSTRACT

A damping device with variable damping force, including a cylinder, in which a piston rod is arranged axially movably, and an adjustable damping valve which is activated as a function of the compression travel of an axle part. The adjustable damping valve is activated by a generator device. The generator device includes an equidirectional device which causes an equidirectional regulating variable to take effect on the adjustable damping valve independently of the compression direction.

13 Claims, 9 Drawing Sheets

DAMPING FORCE DEVICE WITH ADJUSTABLE DAMPING FORCE

BACKGROUND OF THE INVENTION

1. Field of the Invention

The invention relates to a damping force device with adjustable damping force.

2. Discussion of the Prior Art

German reference DE 196 37 095 C2 discloses a vibration damper with variable damping force, in which the damping force is adjustable as a function of the compression travel. As soon as an axle part expands, for example on a bend, there is no damping force adjustment carried out. In the embodiment of the vibration damper according to DE 196 37 095 C2, there is a tendency toward a softer setting of the damping force, since the adjustable damping valve is not additionally pressurized. It was found that it is expedient, on a bend, also to set the vibration damper on the bend-inside wheel with a greater damping force, in order to prevent the wheel from jumping. In vibration dampers, the damping force of which can be adjusted via an electric actuator, the problem of how to set the bend-inside vibration damper with a greater damping force does not arise. Suitable sensor technology allows a controlled setting of the damping force on the basis of many different parameters which characterize the movement of the vehicle and/or of the wheel. By contrast, sensor technology cannot be used in a vibration damper, such as is known, for example, from DE 196 37 095 C2.

SUMMARY OF THE INVENTION

The object of the present invention is to provide a damping device, in which it is possible to adjust the damping force, in particular during a rolling movement of a motor vehicle, and the problems known from the prior art are avoided.

The object is achieved, according to the invention, in that the generator device comprises an equidirectional device which causes an equidirectional regulating variable to take effect on the adjustable damping valve independently of the compression direction.

It is thereby possible that the generator device can be designed in a very simple way. Whether a compression movement or an expansion movement of the wheel is taking place is less important for the damping device.

So that as few regulating or transmission elements as possible need to be used, the generator device is connected to a stabilizer. The stabilizer, by virtue of its principle, has one movement behavior in the case of a suspension movement of the wheels in the same direction or in the case of a suspension movement in a different direction, for example in the case of unilateral compression or on a bend. This movement behavior allows a controlled variation of the damping force in specific compression situations.

In a first embodiment, the generator device is designed as a gear with coupling rods, an output coupling rod exerting a unilaterally directed regulating force independently of an input coupling rod.

With a view to as few gear parts as possible, the stabilizer forms the input coupling rod.

Furthermore, there is provision for the gear to have a coupling rod which is designed as a rocker and on which further coupling rods engage.

In addition, a coupling rod has free motion for one force transmission direction in each case, so that the coupling rods within the gear can transmit a regulating force in only one direction.

In an alternative embodiment, the equidirectional device has for each compression direction at least one working space filled with pressure medium, the pressure medium being conveyed into a control space of the adjustable damping valve through at least one pressure medium line by a displacer.

In order to minimize the use of nonreturn valves and at the same time achieve the safeguarded functioning of the equidirectional device, there is provision for each working space to have a separate displacer, so that the movement of one displacer can be executed independently of a second displacer.

In this case, the displacers assume their maximum stroke position when the vibration damper is in a defined compression position. Strict functional separation of the displacers is achieved by means of this measure. In a different compression position, only one displacer is moved and ensures that pressure medium is conveyed to the control space of the adjustable damping valve.

In addition, the two working spaces have a separate pressure medium line to the control space, the pressure medium lines containing a throttle device. Different throttle settings can be carried out for each suspension direction by means of separate pressure medium lines. In principle, if this possibility is to be dispensed with, the pressure medium lines of the working spaces could be connected to one another and only one common pressure medium line to the control space of the adjustable damping valve be provided.

In order to simplify the outlay for the construction of the equidirectional device, the working spaces are arranged in a common housing.

Thus, there may be provision for the stabilizer to have a split design, one stabilizer portion being connected fixedly in terms of rotation to a pivoting generator shaft and a second stabilizer portion being connected fixedly in terms of rotation to the housing, and a displacer conveying pressure medium to the vibration damper within the housing as a result of the relative movement between the housing and the pivoting generator shaft.

So as not to give rise to damping force adjustment on the adjustable damping valve whenever there is a slight suspension movement, the working movement of the displacer for the reduction of the working space is counteracted by a threshold-force.

With a view to as favorable a utilization of the construction space as possible, the threshold-force is arranged within the working space.

So that a softer damping force setting on the adjustable damping valve does not occur too quickly in the event of a reversal of the suspension movement, the pressure medium flows out of the control space of the adjustable damper through the throttle device back into the working space.

For a rapid response to the adjustable damping valve, a nonreturn valve is connected in parallel to the throttle device.

So that the overall outlay for adjusting the damping force for vibration damping can be kept low, a plurality of vibration dampers of one vehicle axle are connected to the equidirectional device.

In a further development stage, a plurality of vibration dampers of a plurality of vehicle axles may also be connected to the equidirectional device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
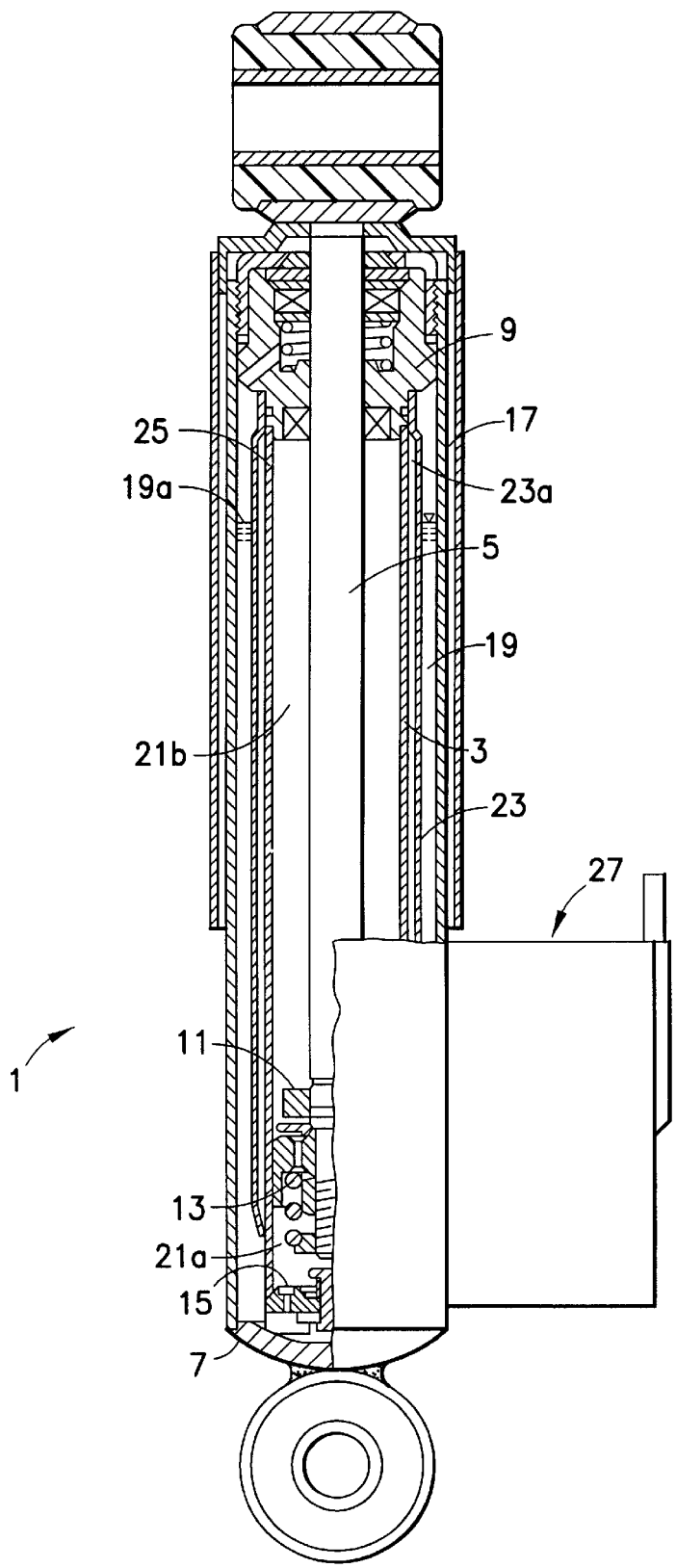
FIG. 1 shows a vibration damper with a laterally arranged adjustable damping valve.

FIG. 1 illustrates a vibration damper 1 with a cylinder 3, in which a piston rod 5 is arranged axially movably. The cylinder 3 is closed off downwardly by a bottom 7. The piston rod 5 is led through a piston rod guide 9 out of the upper end of the cylinder 3. Within the cylinder 3, a piston unit 11 having a piston valve arrangement 13 is fastened to the piston rod 5. The bottom 7 of the cylinder 3 is provided with a bottom-valve arrangement 15. The cylinder 3 is encased by a container tube 17. Between the container tube 17 and the cylinder 1 is formed an annular space 19 which constitutes a compensating space. The space within the cylinder 1 is subdivided by the piston unit 11 into a first working chamber 21a and a second working chamber 21b. The working chambers 21a, 21b are filled with pressure liquid. The compensating space 19 is filled with liquid up to the level 19a and with gas above this. Within the compensating space 19, an intermediate tube 23 forms a first line section, to be precise a high-pressure subsection 23a, which is connected to the second working chamber 21b via a bore 25 of the cylinder 1. Connected to this high-pressure subsection is a valve 27 which is mounted laterally on the container tube 17 and reacts as a function of pressure. A second line section, to be precise a low-pressure subsection, leads (not illustrated) from this valve to the compensating space 19.

When the piston rod 5 is extended upwardly out of the cylinder 3, the upper working chamber 21b is reduced. Overpressure is formed in the upper working chamber 21b and can be decreased into the lower working chamber 21 a by means of the piston valve arrangement 13, as long as the valve 27 reacting as a function of pressure is closed. When the valve 27 reacting as a function of pressure is opened, liquid simultaneously flows from the upper working chamber 21b through the high-pressure subsection 23a and the valve 27 reacting as a function of pressure into the compensating space 19. The damping characteristic of the vibration damper during the extension of the piston rod 5 therefore depends on whether the valve 27 reacting as a function of pressure is open or closed.

When the piston rod 3 is retracted into the cylinder 3, overpressure is formed in the lower working chamber 21a. Liquid can pass from the lower working chamber 21a through the piston valve arrangement 13 upwardly into the upper working chamber 21b. The liquid displaced within the cylinder 1 by the increasing piston rod volume is expelled into the compensating space 19 by the bottom-valve arrangement 15. A rising pressure likewise occurs in the upper working chamber 21b since the throughflow resistance of the piston valve arrangement 13 is lower than the throughflow resistance of the bottom-valve arrangement 15. With the valve 27 reacting as a function of pressure being open, this rising pressure can, in turn, flow through the high-pressure subsection 23a over into the compensating space 19. This means that, with the valve 27 reacting as a function of pressure being open, even during retraction the shock damper has a softer characteristic when the valve 27 reacting as a function of pressure is open and a harder characteristic when the valve 27 reacting as a function of pressure is closed, in exactly the same way as when the piston rod 5 is extended. It should be noted that the direction of flow through the high-pressure subsection 23a of the bypass is always the same, irrespective of whether the piston rod 5 is retracted or extended.

Figure 2:
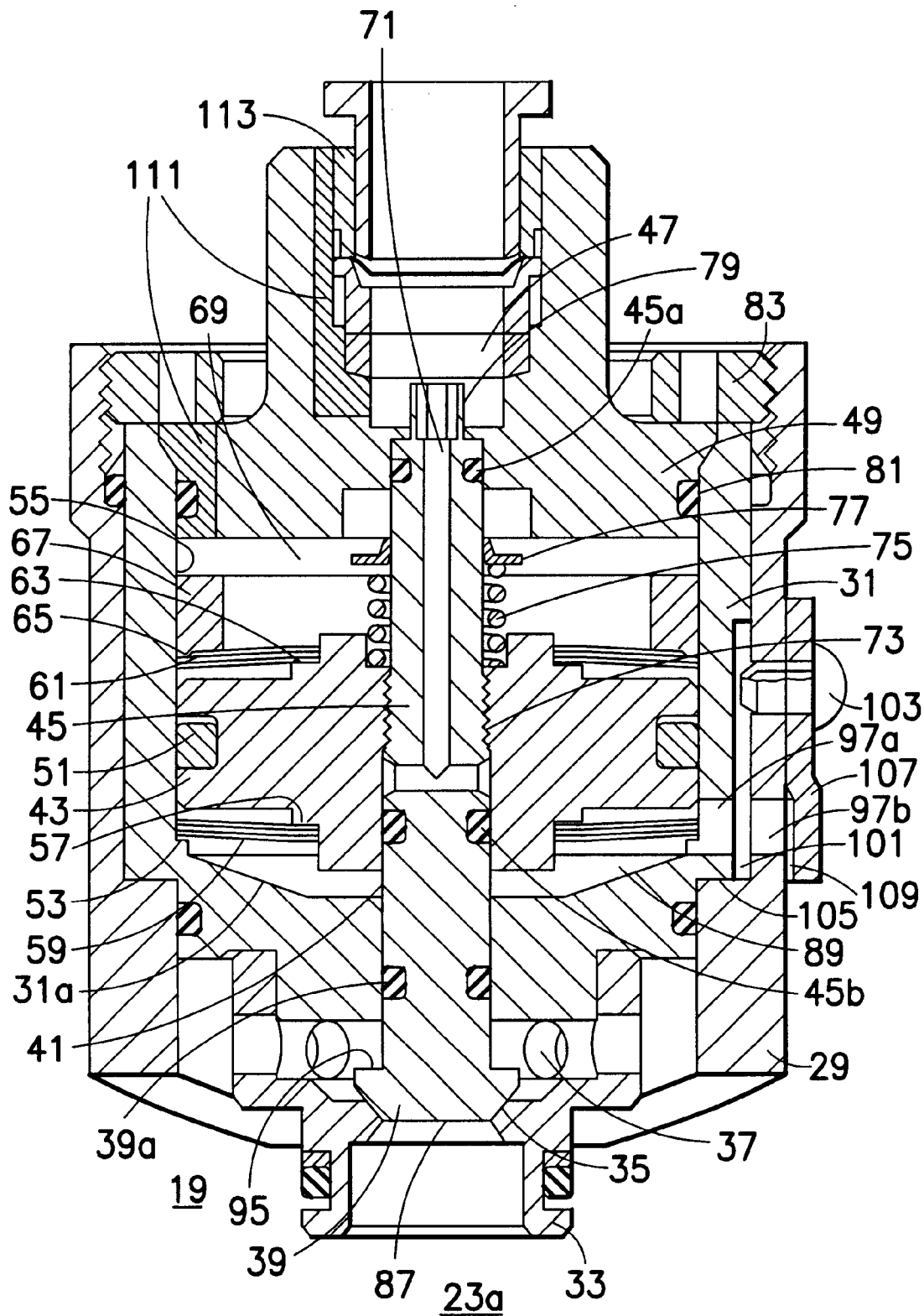
FIG. 2 shows a sectional illustration of the adjustable damping valve of FIG. 1.

FIG. 2 shows an exemplary embodiment of the pressure-dependent valve 27 as an individual component. Within a tubular connection piece 29 arranged on the outside of the container tube 17 is mounted a bowl-shaped insert 31 which has a connection 33 to the high-pressure subsection 23a of the vibration damper. A valve surface 35 and at least one outflow orifice 37 to the compensating space 19 are machined on the bottom of the connection 33.

In this operating position, a valve body 39 is prestressed on the valve surface 35. The valve body 39 is guided radially in a central passage orifice 41 of a pressure intensifier 43, a valve body seal 39a separating the valve body front side from the valve body rear side. The valve body 39 has adjoining it a prolongation 45 which passes completely through the pressure intensifier 43 and which terminates in a pressure connection orifice 47 in a cover 49. The pressure connection orifice 47 is connected to an equidirectional device not illustrated (see FIG. 4).

The pressure in the pressure connection orifice 47, referred to further as control pressure, acts on the pressure intensifier 43 which is guided in an axially floating manner in the bowl-shaped insert 31. The pressure intensifier 43 is formed by a disk which carries a seal 51 on its outside diameter. For this purpose, the inside diameter of the tubular insert is machined as a guide surface 55 from the cover 49 as far as a first supporting surface 53.

A first spring element 59, which preferably consists of layered flat disks, is arranged radially on the outside on the first supporting surface 53 and on a step 57 on the underside of the pressure intensifier 43. A second spring element 61 is braced between a further step 63 of the pressure intensifier 43 and a second supporting surface 65. The second supporting surface 65 is provided by a clamping ring 67, the outside diameter of which is dimensioned with respect to the guide surface 55 so that there is a press fit between these surfaces.

Starting from the seal 51, the guide surface 55 forms, with the top side of the pressure intensifier 43 and with the cover 49, a control space 69 in which the control pressure prevails. The control medium does not pass from the pressure connection orifice 47 directly into the pressure space, since the prolongation 45 is sealed off on the outside relative to the pressure connection orifice 47 by means of a seal 45a. The prolongation 45 has a central throttle inflow duct 71 which reaches approximately as far as the valve body 39. The pressure medium can flow from there through the slight gap between the pressure intensifier 43 and the prolongation 45 as far as a threaded connection which forms a setting device 73. The threaded connection constitutes a continuation of the throttle inflow duct 71. A further seal 45b prevents leakages of compressed air from the control space to a low-pressure space 89.

So that the setting device or the threaded connection operates without play, a prestressing spring 75 is arranged between the prolongation 45 and the top side of the pressure intensifier 43 and prestresses said two components of the threaded connection in such a way that the same threaded flanks are always in engagement. A supporting disk 77 serves as an abutment for the prestressing spring 75.

During assembly, a number of flat disks for the first spring element 59 are first laid onto the first supporting surface 53 in the bowl-shaped insert 31. The pressure intensifier, 43 together with the seal 51, is then introduced into the bowl-shaped insert 31. The prolongation 45 of the valve body 39 is thereafter screwed through the insert into the pressure intensifier 43. The connection 33 is subsequently pressed on the end face onto the tubular insert 31. In a further work step, the second spring element 61 is laid onto the step 63. The subassembly prepared in this way is clamped in a fixture which applies a periodically swelling force from below onto the valve body. The force may be introduced mechanically by means of a ram or hydraulically or pneumatically by means of a pressure medium.

For a specific valve setting, a defined opening force is to be applied to the valve body. At the same time, the pressure intensifier 43 is pressed down via the introduced clamping ring 67 and the second spring element 61. When the intended force gradient on the pressure intensifier 43 is reached, the means for introducing force to the valve body 39 and to the pressure intensifier 43 can be put out of operation. The spring elements are consequently set at an intended spring constant. The clamping ring 67, by virtue of its press fit relative to the guide surface 55, maintains the set position of the spring elements. Tolerances on the spring elements, the steps on the pressure intensifier 43 or the like, are compensated by means of this type of setting.

The prestressing spring 75, together with the supporting disk 77, then has to be mounted. In a further work step, the position of the valve body 39 relative to the pressure intensifier 43 is fixed by means of the setting device 73, in order to set a valve passage cross section between the valve body 39 and the valve surface 35. There may already be provision for determining a valve passage cross section. Alternatively, the valve body 39 may rest, without force, on the valve surface 35 in the opening direction or a prestress may act on the valve body 39 by means of an adjusting movement during which the valve body 39 is unscrewed from the pressure intensifier 43. For the setting movement, the prolongation 45 has at least one tool surface 79 at its end. An operating point on the force characteristic curve of the pressure intensifier 43 can be set by means of the setting device 73.

When the force settings on the structural unit described hitherto are concluded, the bowl-shaped insert 31 is introduced into the tubular connection piece 29. The cover 49, together with its outer cover seal 81, is then pushed into the tubular connection piece 29, until the cover 49 comes to bear on the bowl-shaped insert 31. The cover seal 81 is intended to seal off the control space 69 relative to the surroundings in the region of the valve 27. A cover retaining ring 83 holds the cover 49 in the closed position, the cover 49 itself being rotatable, so that a supply line, not illustrated, can be oriented into a desired position relative to the valve 27.

While the damper is in operation, damping liquid is displaced into the connection 33 of the valve 27 via the high-pressure subsection 23a. The damping medium impinges onto an onflow surface 87 of the valve body 39 as a function of the desired damping force characteristic curve. The pressure on the onflow surface 87, multiplied by the area of the latter, constitutes an opening force which takes effect on the valve body 39 and which acts counter to the resultant closing force arising from the control pressure in the control space 69 on the pressure intensifier 43 and the resultant spring force of the two spring elements 59; 61. When the opening force is greater than the closing force, the valve body 39 is lifted off or an already opened valve body 39, which in the pressureless state already permits a valve passage cross section, is lifted off further. The damping medium can flow into the compensating space 19 via the outflow orifices 37.

A static pressure due to gas being pressurized in the vibration damper, although also acting on the onflow surface 87 of the valve body 39, nevertheless at the same time also acts on a valve body rear side 95, so that only the differential surface composed of the onflow surface 87 minus the valve body rear side 95 remains as an active surface for the static pressure. In the case of an appropriate size difference between the pressure-loaded surface in the control space for the pressure intensifier 43 and the pressure-loaded surfaces on the valve body 39, the influence of the static pressure can be ignored.

The preceding description relates to the ideal situation. However, the situation cannot be ruled out where the seals 51 in the pressure intensifier and the seal 45b in the prolongation 45 of the valve body 39 no longer fulfill their required sealing function. So that a leakage out of the control space 69 into the low-pressure space 89 does not exert any opening force on the pressure intensifier 43 or the valve body 39, the low-pressure space has a venting connection 97 between the low-pressure space 89 and a lower pressure level, as a rule the atmosphere surrounding the valve. The venting connection consists of portions 97a; 97b in the insert 31 and in the tubular connection piece 29. Even when the tubular connection piece 29 is being welded to the container 23, an oriented installation of the tubular connection piece 29 is ensured by the welding appliance having a positioning pin engaging into the portion 97b. What is to be achieved thereby is that, in the case of a vibration damper standing essentially vertically, the portion 97b emerges from the tubular connection piece on the underside and therefore at the lowest point.

The bowl-shaped insert 31, too, must be installed so as to be oriented in position in the circumferential direction. For this purpose, the insert 31 has an installation orientation marking in the form of an axially running groove 101, into which an antitwist device in the form of a pin 103 engages. During assembly, an incorrect installation position of the tubular connection piece 29 is recognized immediately, since the insert 31 comes to bear with its holding surface 105 on the pin 103 and cannot be introduced far enough into the tubular connection piece 29. The insert 31 is twisted until the pin 103 engages into the groove 101 and a further introduction movement is possible.

The pin 103 assumes a second function of holding an inflow throttle element 107. In this case, the inflow throttle element 107 consists of a cap which is bent and therefore only partially covers the venting connection 97. A radial flow path 109 is still available. At all events, the direct penetration of splash water or dust into the lower-pressure space 89 is effectively prevented. The situation cannot be ruled out where water condenses out of the air or splash water penetrates which likewise collects in the low-pressure space 89. The water likewise flows from the insert 31 through the funnel-shaped widening 31a of the wall of the bottom out of the valve 27 into the open via the venting connection. Insofar as the inflow throttle element 107 is formed by a notched stud or a clamping pin, this has at least one groove or slot partially running essentially axially. This slot is entirely sufficient for venting the low-pressure space. Furthermore, the groove or the slot can be oriented in such a way that there is little likelihood that moisture will penetrate into the valve. A separate cap may then be dispensed with.

Figure 3:
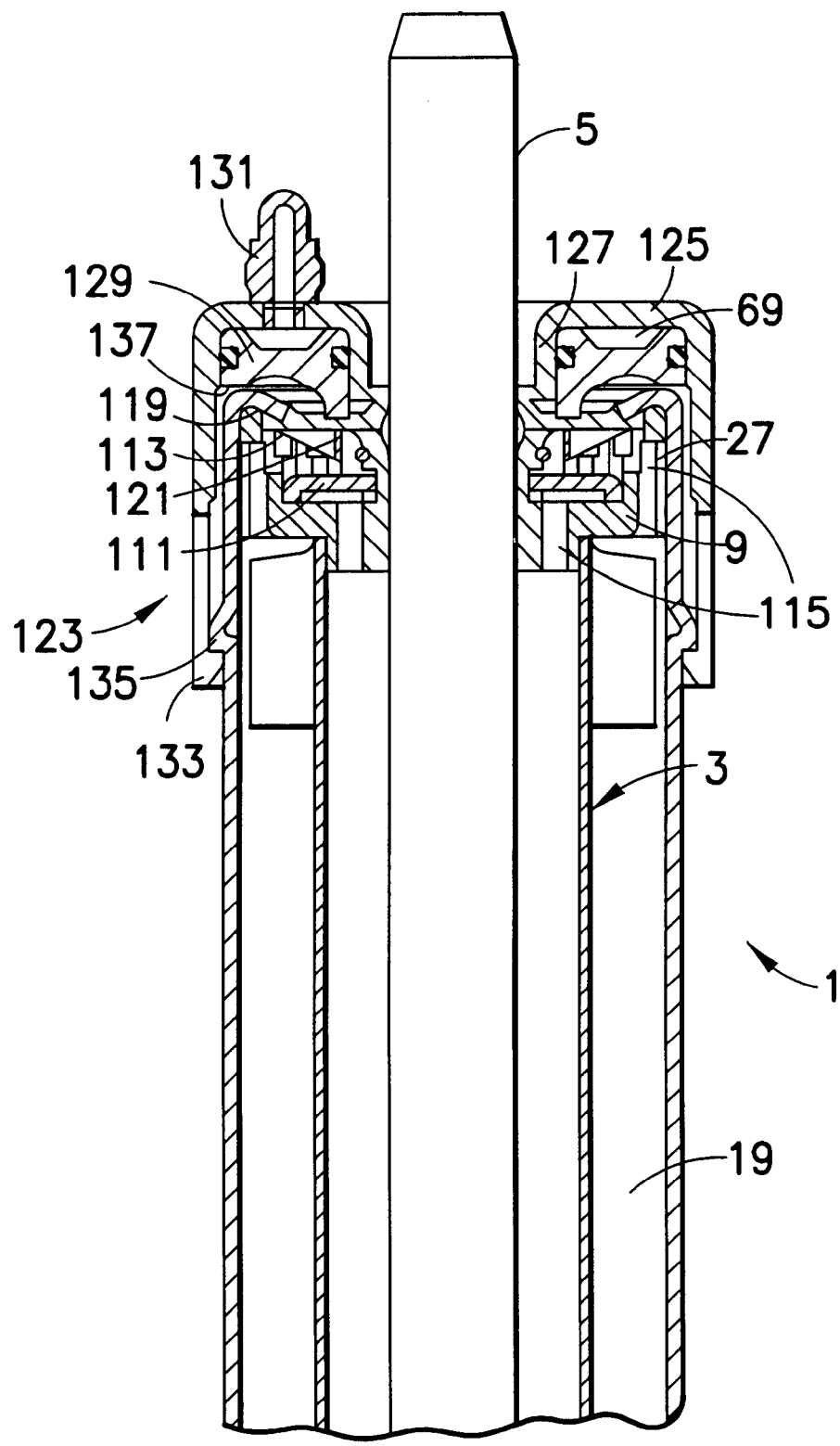
FIG. 3 shows an adjustable damping valve arranged in the vibration damper.

FIG. 3 shows the piston-rod-side end of a vibration damper 1 which has the axially movable piston rod 5 within the cylinder 3. A piston rod guide 9 delimits on the end face the cylinder and consequently the working chamber 21b. Arranged within the piston rod guide 9 is the adjustable damping valve 27 which consists of a valve plate 111 and of a damping valve spring 113. A fluid connection 115 to the compensating space 19 is formed within the piston rod guide and is enabled when the valve plate is lifted off from its valve seat by the pressure in the working space filled with damping medium.

A piston rod seal 119 closes the entire vibration damper 1. The piston rod seal 119 has a reinforcement and is supported on the valve plate 111 via a transmission sleeve 121.

The cylinder is followed axially by a sleeve-shaped carrier 123 which has a bottom 125. The bottom 125, the sleeve part and an annular web 127 of the carrier form, together with a piston 129, the control space 69 which is filled with a pressure medium, for example oil or air, and can be loaded with a control pressure via a pressure connection 131. The piston 129 is prestressed in the direction of the adjustable damping valve by the control pressure within the control space 69 and is supported via the piston rod seal 119 and the transmission sleeve 121 on the valve plate and consequently exerts a closing force on the adjustable damping valve. A seal against the loss of pressure medium is arranged on the inside diameter and on the outside diameter of the piston. Damping medium can flow into the compensating space 19 via the fluid connection as a function of the ratio of the closing force in the control space to the operating pressure in the working chamber 21b.

The carrier 123 has latching means 133 which, together with an abutment 135 of the vibration damper, form a latching connection. During assembly, the carrier 123 is simply pushed onto the vibration damper, until the latching means 133 latch elastically behind the abutment 135. The carrier 123 is fixed axially in the demounting direction. However, the carrier 123 can be pressed further onto the vibration damper in the direction of the adjustable damping valve. The control pressure within the control space 69 ensures that the latching means 133 always bear on the abutment 135. There is therefore no need for the carrier 123 to be secured axially any further. So that the control pressure does not subject the adjustable damping valve to too high a load, the piston 31 has an abutment 137 which limits the piston travel.

FIGS. 1 to 3 disclose a vibration damper 1 which is adjustable as a function of the control pressure. It is to be documented that the adjustable damping valve can be executed at various points of the vibration damper.

Figure 4:
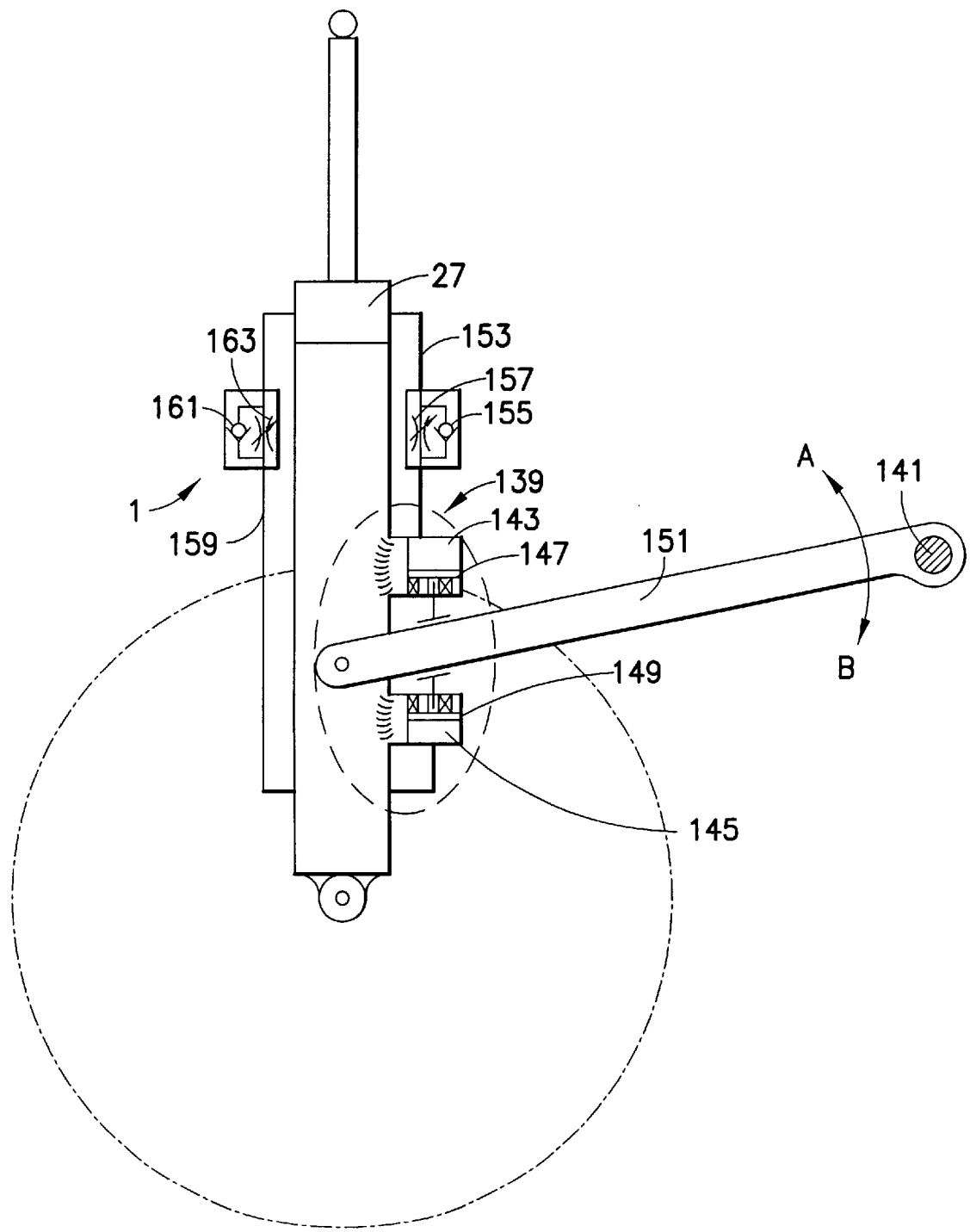
FIG. 4 shows a hydraulic equidirectional device.

FIG. 4 is intended to describe an equidirectional device 139 for controlling the vibration damper 1. The two subassemblies form the damping device. The equidirectional device 139 is activated by a stabilizer 141 and has two working spaces 143; 145 filled with a pressure medium, in each of which an axially movable displacer 147, 149 is arranged. The stabilizer 141 constitutes the generator device for the equidirectional device 139. The two displacers 147, 149 are connected to the stabilizer 141. The connection between the displacer and the stabilizer consists of a simple open contact connection. Only pressure forces can be exerted on the displacers 147, 149 from the stabilizer 141. FIG. 4 illustrates a defined compression position of the vibration damper, in which both displacers 147; 149 assume their maximum extension stroke position and both contact connections are closed. When the angled end 151 of the stabilizer 141 moves in the direction A, the displacer 147 is pressed into the working space 143, with the result that pressure medium is conveyed through a pressure medium line 153 to the adjustable damping valve 27. The other displacer 149 maintains its operating position and does not move, since there is no contact with the angled end 151 of the stabilizer 141. The pressure medium in the pressure medium line 153 flows through an open nonreturn valve 155 in parallel with a throttle 157 which may be adjustable. In the adjustable damping valve 27, the pressure medium acts in the control spaces 69 in the way described previously.

When the angled end 151 of the stabilizer 141 moves back in the direction of the defined compression position again, the pressure medium is pressed out of the control space 69 by the operating pressure in the vibration damper back in the direction of the working space 143. The backflowing pressure medium must necessarily flow through the throttle 157 since the nonreturn valve 155 is closed. The throttle brings about an intended inertia in the adjustment of the damping force from a greater damping force to a lower damping force.

When the angled end 151 of the stabilizer 141 moves in the direction B, the displacer 147 maintains its maximum extension stroke position and the displacer 149 is moved into the working space 145. Once again, pressure medium flows through the pressure medium line 159 to the adjustable damping valve 27, a throttle 163 and a nonreturn valve 161 likewise being interposed. The throttle 163 and the nonreturn valve 161 are advantageous developments of the equidirectional device, but are not absolutely necessary. It is essential that pressure medium is always conveyed to the adjustable damping valve 27, irrespective of the direction of movement of the angled end of the stabilizer 141.

Figure 5:
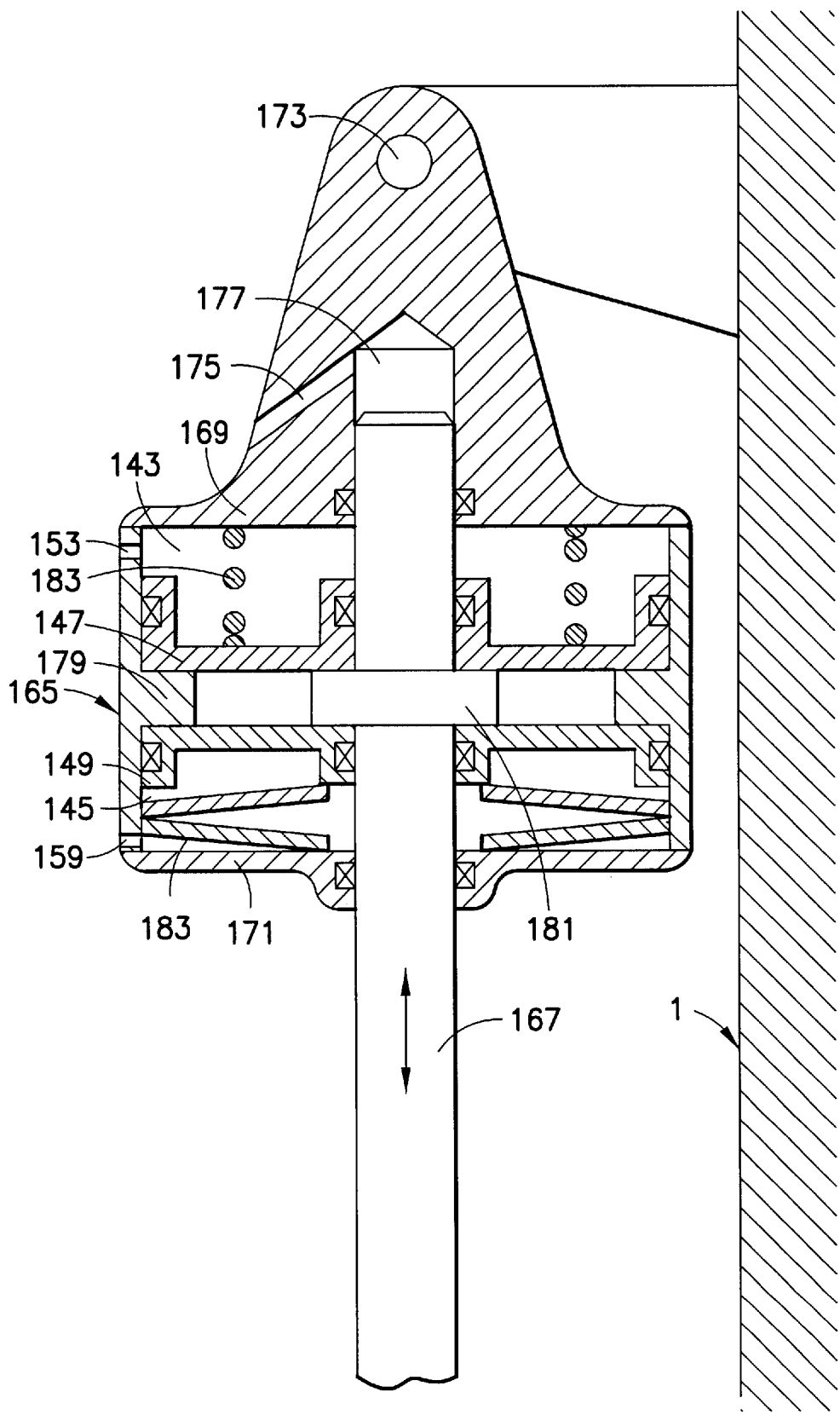
FIG. 5 shows a compact solution of a hydraulic equidirectional device on the principle of FIG. 4.

FIG. 5 shows an equidirectional device on the principle of FIG. 4, in which the two working spaces 143; 145 are combined in a housing 165. A coupling rod 167, which is connected to the angled end 151 of the stabilizer 141, passes through the two working spaces and is mounted in covers 169; 171 of the housing 165 which are arranged in each case on the end faces. The covers, with the displacers 147; 149 sealed off on the inside diameter and on the outside diameter, form, together with a sleeve of the housing, the working spaces 143; 145. The housing, in turn, is arranged on the vibration damper 1 in an articulated manner. The cover 169 having the joint 173 has a venting orifice 175 for the back space 177 of the bearing point.

The housing 165 has a separating web which serves as an axial abutment 179 for the displacers. In the defined level compression position, the two displacers 147, 149 bear on the separating web and consequently assume a maximum retraction position. The separating web may be formed in one part with the housing wall, but also by a retaining ring. The coupling rod has a peripheral flange 181 which bears in each case on the undersides of the displacers 147, 149. During a stabilizer movement, the coupling rod 167 and consequently the flange 181 are pressed upwardly or downwardly against the displacers 147; 149.

The coupling rod 167 does not necessarily have to pass through both displacers. A bearing point in the lower cover 171 would be sufficient. In the design illustrated, in which both displacers are of annular design, two identical displacers may be used.

A threshold-force spring 183 may be arranged within the working spaces 143; 145. This spring generates a counterforce to the introduction of force of the stabilizer 141 or of the coupling rod 167. What is to be achieved is that a particular force threshold first has to be overcome by the stabilizer 141 in order to achieve an adjustment of damping force. The spring used may be a helical spring or else a cup spring which are known per se.

Figure 6:
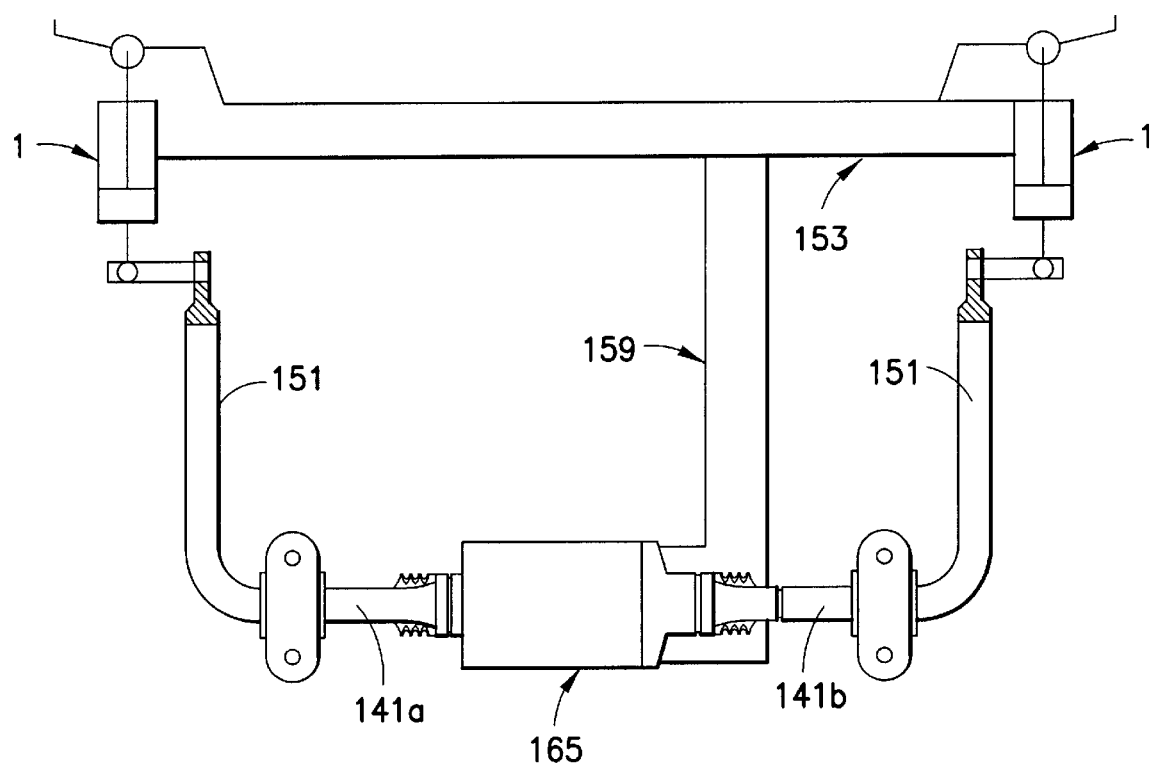
FIG. 6 shows the equidirectional device designed as a pivoting generator.

FIG. 6 shows a top view of a stabilizer 141, the stabilizer consisting of two stabilizer portions, the torsion bars 141a; 141b of which terminate in the housing 165 of a pivoting generator. Starting from the housing, the pressure medium lines 153; 159 run to the vibration dampers 1.

Figure 7:
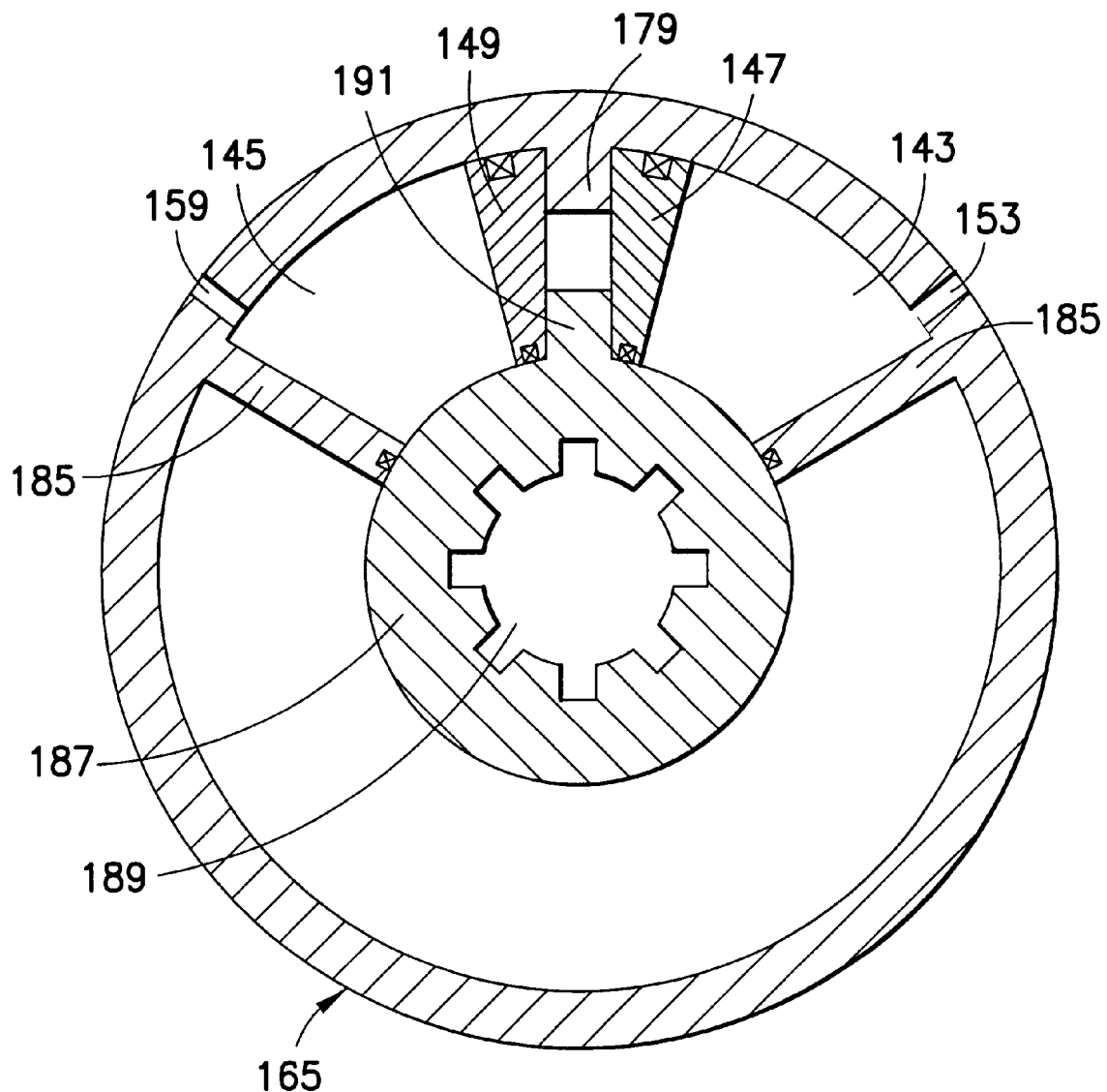
FIG. 7 shows the pivoting generator in section.

FIG. 7 illustrates the housing 165 in section. With reference to FIGS. 4 and 5, the housing delimits at least two working spaces 143; 145, in which the displacers 147; 149 are arranged slidably in the circumferential direction. The housing has, between the working spaces, a rib which serves as an abutment 179. Furthermore, partitions 185 are provided, in which, together with the inner wall of the housing 165, the displacers and the cylindrical surface of a pivoting generator shaft 187, define the working spaces 143; 145. A hub 189 for the connection of one of the stabilizer portions 141a; 141b is illustrated symbolically in the pivoting generator shaft 187. FIG. 7 shows the position of the displacers 147; 149 in the defined compression position. When the vehicle body executes a rolling movement, a twisting movement between the pivoting generator shaft 187 and the housing 165, which is fastened to the other stabilizer portion, occurs as a result of the connection of the stabilizer portions to the vehicle body and via the angled ends 151 on the wheel carrier. A wing 191 on the pivoting generator shaft 187 moves the displacers 147; 149 from the rib 179 in the direction of the partitions 185, with the result that pressure medium is conveyed into the pressure medium lines 153; 159.

Figure 8:
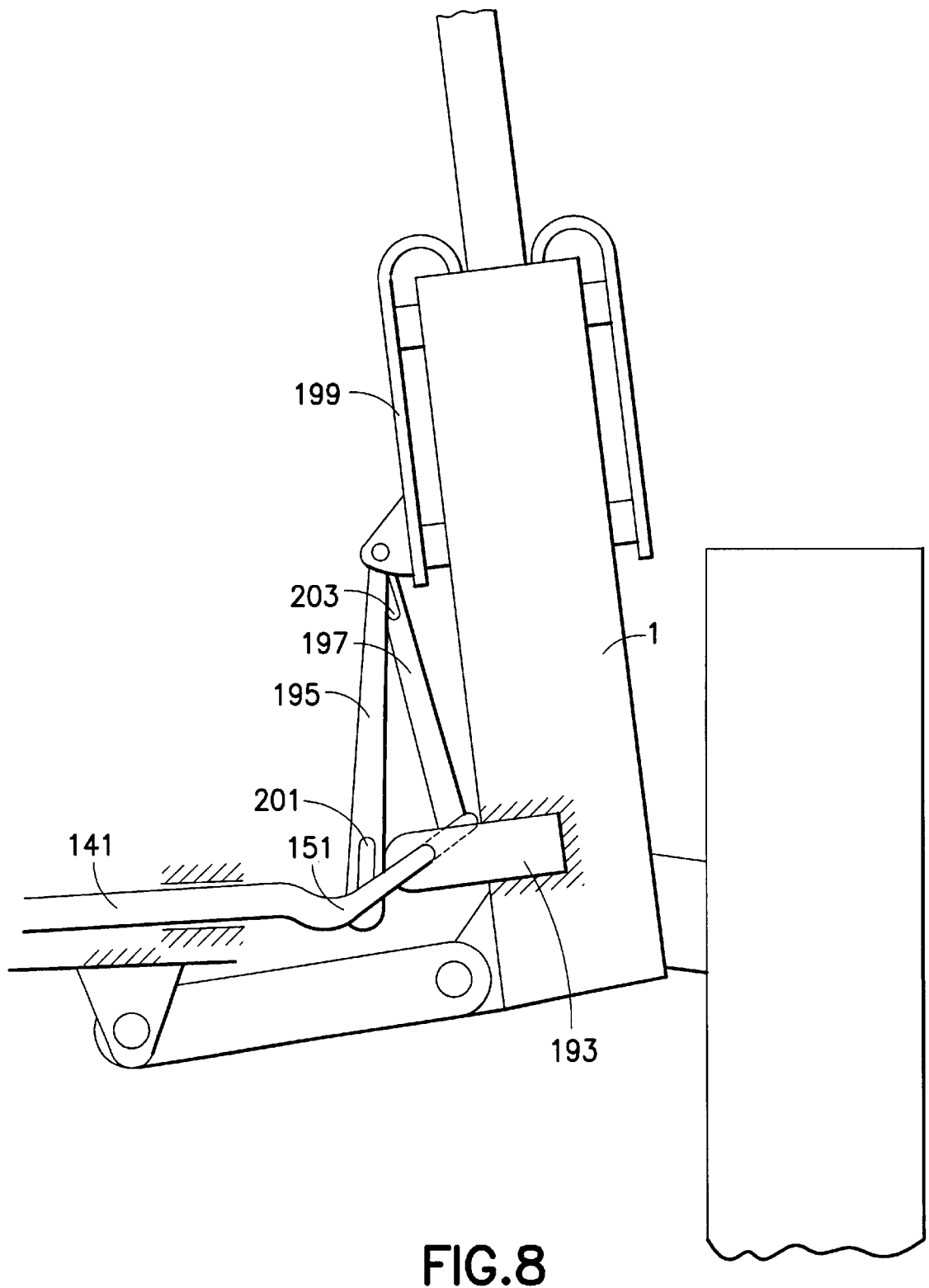
FIG. 8 shows a mechanical equidirectional device.

FIG. 8 illustrates in greatly simplified form a vibration damper 1 designed as an axle damper. A wheel carrier is connected to the cylinder 3 of the vibration damper, the vehicle body, not illustrated, being supported on the piston rod 5. Connected to a vehicle axle is the stabilizer 141 which varies the damping force of the damping valve 27 (FIG. 9).

The stabilizer 141 is fastened to a stabilizer holder 193 in an articulated manner and together with the stabilizer holder forms a rocker. Two coupling rods 195; 197 engage on the rocker. The stabilizer constitutes in functional terms an input coupling rod of a gear. An output coupling rod 199 acts on the damping valve 27 within the piston rod guide (FIG. 9). The two coupling rods 195; 197 have free motion (201; 203) in the form of a long hole. This ensures that, depending on the movement of the angled end 151 of the stabilizer 141, in each case only one coupling rod exerts on the output coupling rod 199 tensile forces which then bring about an adjustment on the damping valve 27.

Figure 9:
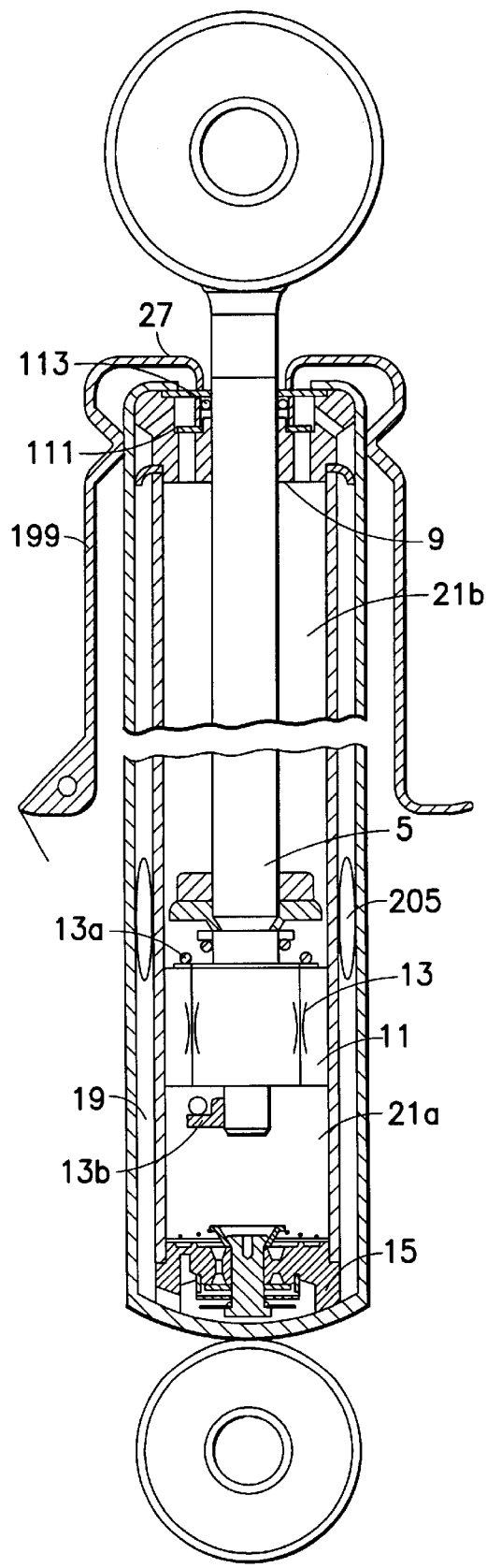
FIG. 9 shows a vibration damper with an adjustable damping valve for a mechanical equidirectional device.

FIG. 9 shows by way of example the design of a vibration damper 1 in the arrangement according to FIG. 8. In principle, the output coupling rod 199 activates the valve plate 111 within the piston rod guide 9 via the transmission sleeve 121. The piston rod guide allows the damping medium to flow out of the upper working chamber 21b into the compensating space 19. A gas bubble 205 is introduced within the compensating space in order to prevent foaming.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto."

I claim:

1. A damping device with variable damping force, comprising:

a cylinder;

a piston rod arranged in the cylinder so as to be axially movable;

an adjustable damping valve activatable as a function of compression travel of an axle part; and a generator device arranged to activate the adjustable damping valve, the generator device comprising an equidirectional device which causes an equidirectional regulating variable to take effect on the adjustable damping valve independently of a direction of the compression travel, the equidirectional device having for each compression direction at least one working space filled with a pressure medium, and a displacer operatively arranged in the working space to convey the pressure medium into a control space of the adjustable damping valve via at least one pressure medium line.

2. A damping device as defined in claim 1, wherein the two working spaces have a separate pressure medium line to the control space, a throttle device being arranged in each of the pressure medium lines.

3. A damping device as defined in claim 2, wherein the pressure medium lines are arranged so that the pressure medium flows out of the control space of the adjustable damping valve through the throttle device back into the working space.

4. A damping device as defined in claim 3, and further comprising a nonreturn valve connected in parallel to the throttle device.

5. A damping device as defined in claim 1, wherein each working space has a separate displacer so that the movement of one displacer can be executed independently of a second displacer.

6. A damping device as defined in claim 5, wherein the displacers are operative to assume a maximum stroke position when the vibration damper is in a defined compression position.

7. A damping device as defined in claim 1, and further comprising a common housing, the working spaces being arranged in the common housing.

8. A damping device as defined in claim 7, wherein the generator device includes a pivoting generator shaft, and further comprising a stabilizer connected to the generator device, the stabilizer having a split design including one stabilizer portion connected fixedly in terms of rotation to the pivoting generator shaft and a second stabilizer portion connected fixedly in terms of rotation to the housing, the displacer being arranged to convey pressure medium to the vibration damper within the housing as a result of relative movement between the housing and the pivoting generator shaft.

9. A damping device as defined in claim 1, and further comprising means for generating a threshold-force that counteracts working movement of the displacer for the reduction of the working space.

10. A damping device as defined in claim 9, wherein the threshold-force generating means is arranged within the working space.

11. A damping device as defined in claim 1, and further comprising a stabilizer connected to the generator device.

12. a damping device as defined in claim 1, wherein a plurality of vibration dampers of a plurality of vehicle axles are connected to the equidirectional device.

13. A damping device as defined in claim 1, wherein a plurality of vibration dampers of one vehicle axle are connected to the equidirectional device.

* * * * *